US010603575B2

(12) United States Patent
Huffman

(10) Patent No.: US 10,603,575 B2
(45) Date of Patent: *Mar. 31, 2020

(54) EDUCATIONAL BALANCING GAME

(71) Applicant: Alexandra Rose Huffman, Chatham, NJ (US)

(72) Inventor: Alexandra Rose Huffman, Chatham, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/008,739

(22) Filed: Jun. 14, 2018

(65) Prior Publication Data

US 2018/0304150 A1 Oct. 25, 2018

Related U.S. Application Data

(60) Division of application No. 15/296,289, filed on Oct. 18, 2016, now Pat. No. 10,026,333, which is a
(Continued)

(51) Int. Cl.
*A63B 67/00* (2006.01)
*A63F 9/18* (2006.01)
(Continued)

(52) U.S. Cl.
CPC ............ *A63F 9/183* (2013.01); *A63F 13/214* (2014.09); *A63F 13/235* (2014.09); *A63F 13/323* (2014.09); *G09B 7/06* (2013.01); *A63B 67/00* (2013.01); *A63F 13/335* (2014.09); *A63F 2003/00359* (2013.01);
(Continued)

(58) Field of Classification Search
CPC .. G09B 7/06; G09B 7/07; G09B 7/073; A63F 13/214; A63F 9/183; A63F 2009/241; A63F 13/323; A63F 13/335; A63F 2003/00359; A63F 2009/242; A63F 2009/2489;
(Continued)

(56) References Cited

U.S. PATENT DOCUMENTS 3,454,279 A * 7/1969 Rabens .................. A63B 67/00
273/141 R
3,559,995 A 2/1971 Steadman
(Continued)

OTHER PUBLICATIONS

Heidi Raki,"Raki's Rad Resources: Twister Math", http://www.rakisradresources.com/2012/05/twister-math.html, May 27, 2012.
(Continued)

*Primary Examiner* — Joseph B Baldori
(74) *Attorney, Agent, or Firm* — MG Miller Intellectual Property Law LLC

(57) ABSTRACT

The application provides for a system and method of playing an educational balancing game. An electronic game spinner is used to select a category to be tested, as well as a specific question within this category. Once the specific question has been selected, potential answers are shown on an electronic game board whereby a user must then use their body to select a circle containing an answer. The game board may also be constructed out of plastic, where the answers are fixed, however, the electronic game spinner scans a code on the game board so that appropriate questions are used with the printed answer selections.

1 Claim, 11 Drawing Sheets

Related U.S. Application Data continuation-in-part of application No. 14/817,322, filed on Aug. 4, 2015, now abandoned.

(60) Provisional application No. 62/120,244, filed on Feb. 24, 2015.

(51) Int. Cl.

| | | |
|---|---|---|
| *G09B 7/06* | (2006.01) | |
| *A63F 13/214* | (2014.01) | |
| *A63F 13/323* | (2014.01) | |
| *A63F 13/235* | (2014.01) | |
| *A63F 9/24* | (2006.01) | |
| *A63F 3/00* | (2006.01) | |
| *A63F 13/335* | (2014.01) | |

(52) U.S. Cl.
CPC ... *A63F 2009/241* (2013.01); *A63F 2009/242* (2013.01); *A63F 2009/2489* (2013.01); *A63F 2250/21* (2013.01); *A63F 2300/1031* (2013.01); *A63F 2300/1068* (2013.01); *A63F 2300/1075* (2013.01)

(58) Field of Classification Search
CPC .......... A63F 2250/21; A63F 2300/1031; A63F 2300/1068; A63F 2300/1075; A63B 67/00
USPC ....... 273/237, 430, 431, 432, 445, 449, 453, 273/454, 455
See application file for complete search history.

(56) References Cited

U.S. PATENT DOCUMENTS

| | | | |
|---|---|---|---|
| 3,761,084 A | 9/1973 | Dieckmann | |
| 3,841,628 A | 10/1974 | Goldfarb | |
| 3,879,034 A | 4/1975 | Petrusek | |
| 3,927,880 A | 12/1975 | Petrusek | |
| 3,930,321 A | 1/1976 | Goldfarb | |
| 3,970,312 A | 7/1976 | Senn | |
| 4,009,880 A | 3/1977 | Lammersen | |
| 4,039,186 A | 8/1977 | Anderson | |
| 4,340,223 A | 7/1982 | Kuna | |
| 4,372,554 A | 2/1983 | Orenstein | |
| 4,720,789 A | 1/1988 | Hector | |
| 4,773,643 A | 7/1988 | Mizunuma | |
| 4,787,631 A | 11/1988 | Erumsele | |
| 4,895,364 A | 1/1990 | Martel | |
| 4,953,869 A * | 9/1990 | Muhammad | A63F 9/18 273/141 R |
| 4,982,959 A | 1/1991 | Rudell | |
| 5,009,419 A | 4/1991 | Streeter | |
| 5,088,928 A * | 2/1992 | Chan | A63F 3/00643 273/237 |
| 5,190,285 A | 3/1993 | Levy | |
| 5,283,558 A | 2/1994 | Chan | |
| 5,328,190 A | 7/1994 | Dart | |
| 5,439,228 A | 8/1995 | Pedersen | |
| 5,507,495 A | 4/1996 | Kiss | |
| 5,516,111 A | 5/1996 | Strickland, Jr. | |
| 5,664,779 A | 9/1997 | Soovajian, Jr. | |
| 5,735,693 A | 4/1998 | Groiss | |
| 5,800,263 A | 9/1998 | Hayashida | |
| 5,803,745 A * | 9/1998 | Kozak | A63B 69/0053 434/236 |
| 5,839,976 A | 11/1998 | Darr | |
| 5,853,327 A * | 12/1998 | Gilboa | A63F 3/00643 463/39 |
| 5,882,011 A | 3/1999 | Praria | |
| 5,924,740 A | 7/1999 | Romans | |
| 5,971,761 A | 10/1999 | Tillman, Sr. | |
| 5,997,304 A * | 12/1999 | Wood | G09B 5/062 434/156 |
| 6,254,101 B1 | 7/2001 | Young | |
| 6,322,074 B1 * | 11/2001 | Forrest | A63F 9/183 273/272 |
| 6,378,871 B1 | 4/2002 | Roberts | |
| 6,435,880 B1 | 8/2002 | Tsumori | |
| 6,450,886 B1 | 9/2002 | Oishi | |
| 6,497,412 B1 * | 12/2002 | Bramm | A63F 9/183 273/430 |
| 6,536,772 B1 | 3/2003 | Young | |
| 6,774,900 B1 | 8/2004 | Kubota | |
| 6,821,206 B1 | 11/2004 | Ishida | |
| 6,940,783 B2 | 9/2005 | Fox | |
| 7,050,754 B1 * | 5/2006 | Marcus | G09B 1/06 345/156 |
| 7,264,545 B2 | 9/2007 | Maya | |
| 7,355,134 B1 | 4/2008 | Anderson | |
| 7,481,726 B2 * | 1/2009 | Hawk | A63B 67/00 473/414 |
| 7,573,462 B2 * | 8/2009 | Ouchi | G06F 3/03545 178/18.01 |
| 8,109,819 B2 | 2/2012 | Hughes | |
| 8,147,251 B1 | 4/2012 | Anson | |
| 8,123,586 B2 | 12/2012 | Dell | |
| 8,491,383 B2 * | 7/2013 | Yamamoto | A63F 13/26 463/31 |
| 8,512,151 B1 * | 8/2013 | Mkrtchyan | A63F 13/2145 273/237 |
| 8,540,569 B2 | 9/2013 | Orlinsky | |
| 8,568,216 B2 | 10/2013 | Decre | |
| 8,579,288 B2 | 11/2013 | Sampleton | |
| 8,651,953 B2 | 2/2014 | Ritter | |
| 8,758,136 B2 | 6/2014 | Briggs | |
| 8,794,975 B2 | 8/2014 | Davey | |
| 8,972,882 B2 | 3/2015 | Berry | |
| 8,976,501 B2 | 3/2015 | Smoot | |
| 9,003,333 B2 * | 4/2015 | Ho | A63F 13/04 715/845 |
| 9,576,495 B2 * | 2/2017 | Carney | G09B 5/08 |
| 9,675,878 B2 * | 6/2017 | Barney | A63F 13/428 |
| 9,737,798 B2 * | 8/2017 | Davis | A63F 9/24 |
| 2004/0127285 A1 | 7/2004 | Kavana | |
| 2005/0073105 A1 * | 4/2005 | Given | A63B 67/00 273/449 |
| 2005/0112538 A1 | 5/2005 | Pinkins | |
| 2005/0137004 A1 | 6/2005 | Wood | |
| 2005/0153265 A1 | 7/2005 | Kavana | |
| 2005/0170873 A1 | 8/2005 | Fishbach | |
| 2005/0187023 A1 | 8/2005 | Miyamoto | |
| 2006/0082059 A1 | 4/2006 | Lee | |
| 2007/0166686 A1 | 7/2007 | Foster | |
| 2007/0218440 A1 * | 9/2007 | Delahunt | G09B 7/02 434/236 |
| 2007/0279394 A1 * | 12/2007 | Lampell | A63F 13/00 345/173 |
| 2008/0280684 A1 * | 11/2008 | McBride | A63F 13/12 463/42 |
| 2009/0163261 A1 | 6/2009 | Crompton | |
| 2009/0325693 A1 | 12/2009 | Ron | |
| 2010/0087296 A1 | 4/2010 | Hansen | |
| 2010/0092929 A1 | 4/2010 | Hallowell | |
| 2010/0113152 A1 | 5/2010 | Shmuel | |
| 2010/0279258 A1 | 11/2010 | Cohen | |
| 2010/0295248 A1 | 11/2010 | Krause | |
| 2010/0331083 A1 * | 12/2010 | Maharbiz | A63F 3/00214 463/30 |
| 2011/0014979 A1 * | 1/2011 | Ueshima | A63F 13/06 463/31 |
| 2011/0022982 A1 | 1/2011 | Takaoka | |
| 2011/0053688 A1 | 3/2011 | Crawford | |
| 2011/0105227 A1 | 5/2011 | Matsumoto | |
| 2011/0195392 A1 * | 8/2011 | Kim | G09B 19/00 434/365 |
| 2011/0275038 A1 | 11/2011 | Penner | |
| 2011/0319153 A1 | 12/2011 | Gomez | |
| 2012/0015729 A1 | 1/2012 | Takehiro | |
| 2012/0162261 A1 | 6/2012 | Kim | |
| 2012/0184368 A1 | 7/2012 | Yamaoka | |
| 2012/0214592 A1 * | 8/2012 | Yamamoto | A63F 13/44 463/31 |

(56) References Cited

U.S. PATENT DOCUMENTS

| | | | |
|---|---|---|---|
| 2013/0069312 A1* | 3/2013 | Letchford | A63F 3/00 |
| | | | 273/449 |
| 2013/0109471 A1 | 5/2013 | Yamamoto | |
| 2013/0123009 A1 | 5/2013 | Maharbiz | |
| 2013/0155105 A1 | 6/2013 | Boldyrev | |
| 2013/0164726 A1* | 6/2013 | Michalowski | G09B 7/02 |
| | | | 434/362 |
| 2013/0189660 A1 | 7/2013 | Mangum | |
| 2013/0244780 A1 | 9/2013 | Akiyama | |
| 2013/0331182 A1* | 12/2013 | Tanzawa | A63F 13/426 |
| | | | 463/31 |
| 2014/0038720 A1 | 2/2014 | Reeskamp | |
| 2014/0087844 A1 | 3/2014 | Gilliland | |
| 2014/0087897 A1 | 3/2014 | Nally | |
| 2014/0106876 A1 | 4/2014 | Knutsson | |
| 2014/0248590 A1 | 9/2014 | McCormick | |
| 2014/0274254 A1 | 9/2014 | Leites | |
| 2014/0309002 A1 | 10/2014 | O'Gorman | |
| 2015/0038212 A1 | 2/2015 | Watkins | |
| 2015/0064676 A1 | 3/2015 | Carulli | |

OTHER PUBLICATIONS

Michele Williams, "Math Twister: A New Twist on an Old Game", http://mathtutorphd.com/blog/math-twister-a-new-twist-on-an-old-game/, published Feb. 5, 2015.

Ben Bosley, "Math Twister", http://www.mathtwister.com/about/about-us/, Mar. 2012.

* cited by examiner

EDUCATIONAL BALANCING GAME

CLAIM OF PRIORITY

This application is a divisional of U.S. patent application Ser. No. 15/296,289, which is a continuation-in-part of U.S. application Ser. No. 14/817,322 filed on Aug. 4, 2015, which claims priority from U.S. Provisional Application No. 62/120,244, filed on Feb. 24, 2015, the contents of all of which are hereby fully incorporated by reference.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

BACKGROUND

Field of the Embodiments

The present disclosure relates to an educational balancing game, namely interactive electronic or board games with an educational focus, involving placing an aspect of a participant's anatomy on the appropriate predesignated area.

It is well known that the majority of children need some encouragement to study academic subjects. While there are many different ways in which people attempt to get children to study, one popular method is through the gamification of studying; turning the act of studying into a fun game so that the child will have a desire to engage in studying. There are many games that attempt to engage a child in this way, but few of these games are active, and even fewer of them can reasonably be classified as "fun."

Confounding this problem is the fact that all humans, generally, participate in different styles of learning. Typically, these styles are auditory, visual, and kinesthetic. Thus, games that fail to address all three of these subsets will not educate all children effectively. Accordingly, there is a need for an active, educational game that employs one or more of these learning styles that is equally accessible and effective to learners of all types.

Review of Related Technology

U.S. Pat. No. 5,507,495 pertains to games for teaching alphabet, numbers, colors, shapes and math along with coordination and motor skills comprising a planar member having a circle at its central interior and having curves therearound to define a plurality of zones around the center. The zones have lines that extend radially therethrough, some of which are offset from each other to define segments with indicia in the form of an alphabet, number, color, and/or shape marked in each of the segments. A plurality of indicia is correlated to the indicia of the planar member, such plurality of indicia being randomly selectable by the players.

U.S. Pat. No. 3,454,279 pertains to an apparatus for playing a game wherein the objective of each player is to force his opponent or opponents first to fall to the ground. In a series of successive steps, each of the players, responsive to a command, moves, simultaneously with his opponent, a command-designated limb of his respective anatomy to a player-selected one of a plurality of command-designated delineated areas within a playing arena, all to the end on the part of each player to so entwine or interengage himself with the opposing player as to allow such opposing player no alternative but to be forced to assume a gamelosing position.

Raki's Rad Resources (http://www.rakisradresources.com/2012/05/twister-math.html) teaches an improved version of the popular game Twister®, wherein a plurality of numbers are disposed on a standard playing board. That game contemplates graphing the frequency in which certain events occur and team-based arithmetic practice.

The Math U Can blog (http://mathtutorphd.com/blog/math-twiste-a-new-twist-on-an-old-game/) teaches another math-themed twister. This variant disposes numbers on the spinner. A participant spins the spinner which eventually will land on a number. Once this number is chosen the mat will be disposed with multiples of the selected number. The spinner is spun again and the participants will place an appendage on the number on the mat that is equal to the first number multiplied by the second number. This disclosure also contemplates a similar game involving division, addition, and subtraction.

While these units may be suitable for the particular purpose employed, or for general use, they would not be as suitable for the purposes of the present disclosure as disclosed hereafter.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

SUMMARY

The present disclosure provides for an educational balancing game to be played by one or more players, the winner of the game being the first to earn a predetermined amount of points by answering a corresponding amount of questions correctly, by using an appendage to select a correct answer from a number of options, comprising: an electronic game board, comprising: a top surface, having a touch-sensitized display disposed thereon, a bottom surface, located below the top surface; a plurality of walls extending between the top surface and the bottom surface, the plurality of walls having a recess and a power port; a chamber defined by the top surface, the bottom surface, and the plurality of walls, wherein the electronic game board is configured to show a plurality of answer zones on the touch-sensitized display, each of the plurality of answer zones having a size and a position, wherein the size and the position are dynamic until selected by one of the players, wherein the chamber is sized to accommodate multiple human users, and wherein the chamber is strong enough to support the weight of multiple human users; and a prompter, comprising: a touch-sensitized display configured to display a category chooser, a spinner, and a spin initiator; a memory having a set of questions and a plurality of corresponding answer choices; and a wireless transceiver for transmitting the plurality corresponding answer choices to the electronic game board for display, wherein one of the answer choices is displayed within the one of the answer zones. In some embodiments the plurality of answer zones are color-coordinated to indicate to players which appendage is to be used.

The present disclosure also provides for a method of playing an educational balancing game, for helping one or more human users educate themselves while developing motor skills by standing on and interacting with an electronic game board, the electronic game board having a top surface, having a touch-sensitized display disposed thereon, a bottom surface, located below the top surface, a plurality of walls extending between the top surface and the bottom surface, the plurality of walls having a recess and a power port, a chamber defined by the top surface, the bottom surface, and the plurality of walls, wherein the electronic game board is configured to show a plurality of answer zones on the touch-sensitized display, and a prompter having a touch-sensitized display and a wireless transceiver, for providing wireless electronic communication with the electronic game board, the method comprising the steps of: selecting, by a user, a final score; choosing, a category of questions; entering, a number of users playing the educational game; initializing, by the prompter, a spinner and spin initiator; engaging, by the user, the spin initiator; displaying, by the prompter, a question; displaying, by the electronic game board, a plurality of answer zones, the plurality of answers zones containing an amount of correct answers that corresponds to the number of users playing the educational game, the remainder of the plurality of answer zones containing incorrect answers, wherein each answer zone contains one answer, each answer zone having a size and a position, where the size is dynamic and the position is dynamic; selecting, by each user using one appendage, one of the plurality of answer zones, wherein the size and the position of the selected answer zone becomes static upon selection; adding, by the prompter, a point to each user that selected an answer zone with the correct answer; repeating steps the question and answer steps until one user has an amount of points equal to the final score. Preferably, the plurality of answer zones are non-uniformly sized. In another preferred embodiment, a user will have a predetermined time limit to select the appropriate answer zone. In a highly preferred embodiment, this predetermined time limit will be selected by the user via the prompter and the electronic game board can detect whether a player has fallen over while attempting to select one of the plurality of answer zones; the method will terminate if the electronic game board detects such an event. In some embodiments, the category of questions is selected randomly by the prompter, and in other embodiments the actual question is selected randomly by the prompter. In some embodiments, this method employs at least one additional electronic game board, allowing the plurality of answer zones to travel, independently, from the first electronic game board to one of the additional electronic game boards. This method also supports the color coordination of the plurality of answer zones to indicate which human appendage is to be used to select that answer zone. Many preferred embodiments contain a database of questions and corresponding answer choices which are stored in an external database.

Additionally, the present disclosure further provides for an electronic game system for use by one or more players to engage in an educational balancing game by using the appendages of a player, the electronic game system comprising: a plurality of game boards, each game board comprising: a top surface, having a touch-sensitized display disposed thereon; a bottom surface, located below the top surface; a plurality of walls extending between the top surface and the bottom surface, the plurality of walls having a recess and a power port; a chamber defined by the top surface, the bottom surface, and the plurality of walls, wherein the electronic game board is configured to show a plurality of answer zones on the touch-sensitized display; and a prompter, comprising: a touch sensitized display configured to display a category chooser, a spinner, and a spin initiator; and a wireless transceiver, wherein each of each of the plurality game boards in is electronic communication with the other plurality of game boards and the prompter, providing for one or more of the answers zones to travel from the touch-sensitized display of one electronic game board to the touch-sensitized display of a second electronic game board. Preferably, the plurality of walls includes a speaker grill and the chamber includes at least one speaker, where the at least one speaker is located proximately to the speaker grill.

The method of the present invention provides a novel improvement over past methods of educating children. By combining the learning experience with an active game, children are being stimulated and incentivized to learn at an increased rate. Studies have shown that most people, when it comes to how they learn material, fall into one of three categories: visual; auditory; and kinesthetic. The present invention strikes at all three of these learning styles to provide for a more holistic approach to serving educational material to a student. The visual learners will be stimulated by seeing the question and answers appear on the spinner and game board. While not all embodiments are specifically tailored for the auditory learners, many embodiments exist where the questions are read aloud by the game spinner, and other embodiments where the participant is encouraged to state their selected answers audibly at the end of a round. The kinesthetic learners will be stimulated by the fact that they must physically select the correct answer with part of their body, and must move again to select a subsequent answer. The inherent activeness with this activity, coupled with the visual stimulation, and, in some embodiments, the auditory stimulation, shows that the system and method of the present invention are applying modern-learning principles to allow for improved learning. Further, this game will enhance the effect of the education due to the repetition in the prompting and answering of the questions.

It is an object of the present invention to provide an entertaining way to learn.

It is an object of the present invention to gamify the learning of information.

It is an object of the present invention to provide a game that is entertaining for children and adults alike.

It is an object of the present invention to educate children.

It is an object of the present invention to provide a game that children and adults both enjoy.

It is an object of the present invention to provide an educational game that is equally applicable to a variety of subjects.

It is an object of the present invention to provide a means for multiple people to engage in simultaneous learning.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

Figure 1:
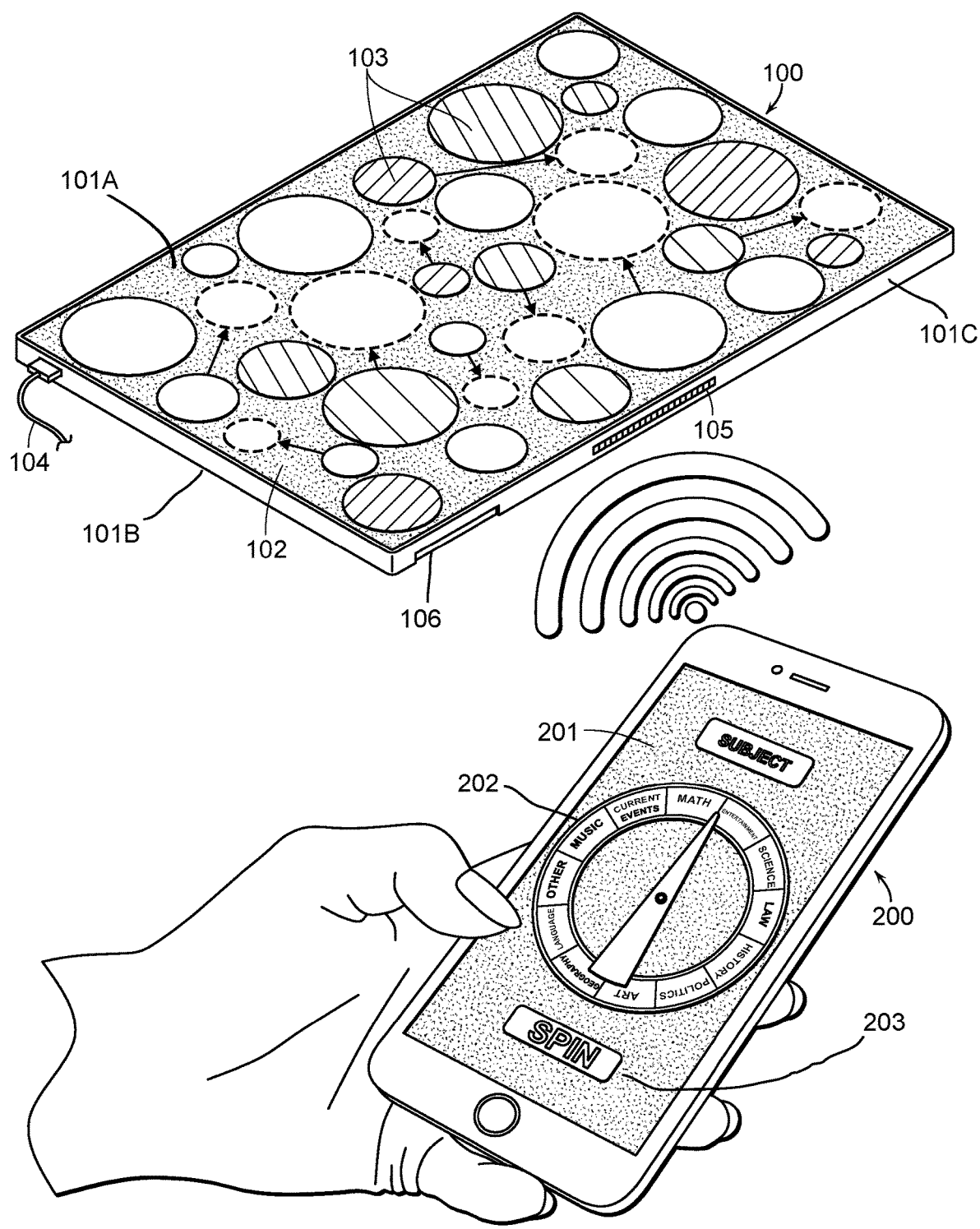
FIG. 1 shows a perspective view of an embodiment of the system of the present invention.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As a threshold matter, it should be noted that for the purposes of this disclosure the terms "prompter" and "electronic game spinner" are to be used interchangeably, and refer to the same components of the present invention. The term "random," as used in this application, does not refer to true random selection, which only living beings are capable of. Rather, the term "random," when used here, refers to a selection algorithm used by computers. For example, the algorithm might select the digit from the current time to act as the "random" number. There exist a multitude of selection algorithms known in the art.

Referring to FIG. 1, a perspective view of an embodiment of the system of the present invention is provided for. Here, a prompter 200 having a touch-sensitized display 201 is shown. Additionally, the spinner 202 and spin initiator 203 are shown displayed on the prompter 200. Also shown is a game board 100. Here, the game board 100 includes a top surface 101A having a touch-sensitized display 102, a bottom surface 101B, and a plurality of walls 101C that extend between the top surface and the bottom surface. The touch-sensitized display 102 is shown with a plurality of answer zones 103. In the particular embodiment shown here, the plurality of walls 101C features a power port 104, a speaker grill 105, and a recess 106.

The game according to the present disclosure begins when a user touches the spin initiator 203. In a preferred embodiment, the spinner 202 will rotate about the center of a wheel of categories for some amount of time. After a predetermined amount of time, the spinner 202 will stop, landing on a given category. In some embodiments, there is only a single question/answer set for a given category, while in other embodiments there are multiple question/answer sets. In the single question/answer set embodiment, that question/answer set is loaded and the respective potential answers are sent to the game board 100. In a preferred embodiment, correct answers as well as some known incorrect answers are sent to the game board 100. This provides the additional benefit of a user not being able to select a first answer zone 103 they see. This enhances the educational value of the game, as both speed and accuracy are rewarded in this embodiment. In the multiple question/answers, a question/answer set is selected randomly. In yet another preferred embodiment, once a category has been selected, the prompter 200 will show a sub-category (See FIG. 6B). A similar animation of the spinner 202 spinning is shown for the subcategory, and from that subcategory a question is randomly selected.

Figure 2A:
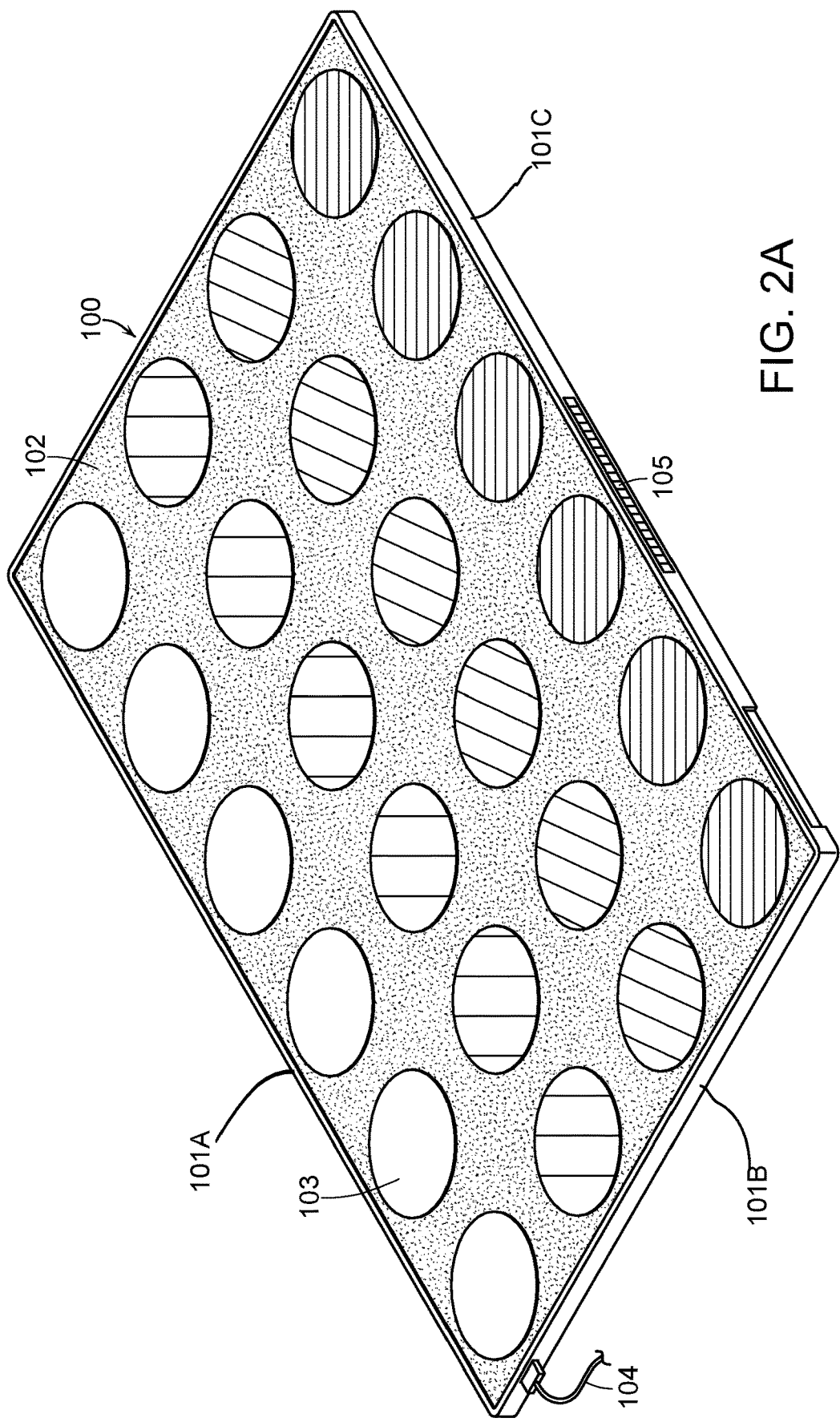
FIG. 2A shows a perspective view of an embodiment of the electronic game board of the present invention.

Turning to FIG. 2A a perspective view of an embodiment of the game board 100 is shown. Here, the game board 100 features at least one touch-sensitized display 102, the power port 104, the plurality of answer zones 103, and the speaker grill 105. In a preferred embodiment, the game board 100 is built such that multiple adults may utilize the board without the board breaking under the weight. Further, while this particular embodiment uses a single display inside of a single housing, the present invention contemplates multiple displays within a single housing, or multiple displays within multiple housings. In one embodiment the game board 100 is operated via the standard 120V or 240V wall outlet connected via the power port 104. In another embodiment, the game board 100 is equipped with a battery housed within a chamber bounded by the top surface 101A, the bottom surface 101B, and the plurality of walls 101C. This battery is preferably a lithium-ion battery, although most batteries are suitable for use with the game board 100. This embodiment is equipped with a speaker within the chamber discussed above. This speaker is located proximate to the speaker grill 105. This is beneficial as the present invention can add auditory cues to both the question delivery and answering. In one embodiment, the game board 100 will read the question aloud. In other embodiments, the game board 100 will make a positive sound when the proper answer zone 103 is touched, and a negative sound when an improper answer zone 103 is touched.

Figure 2B:
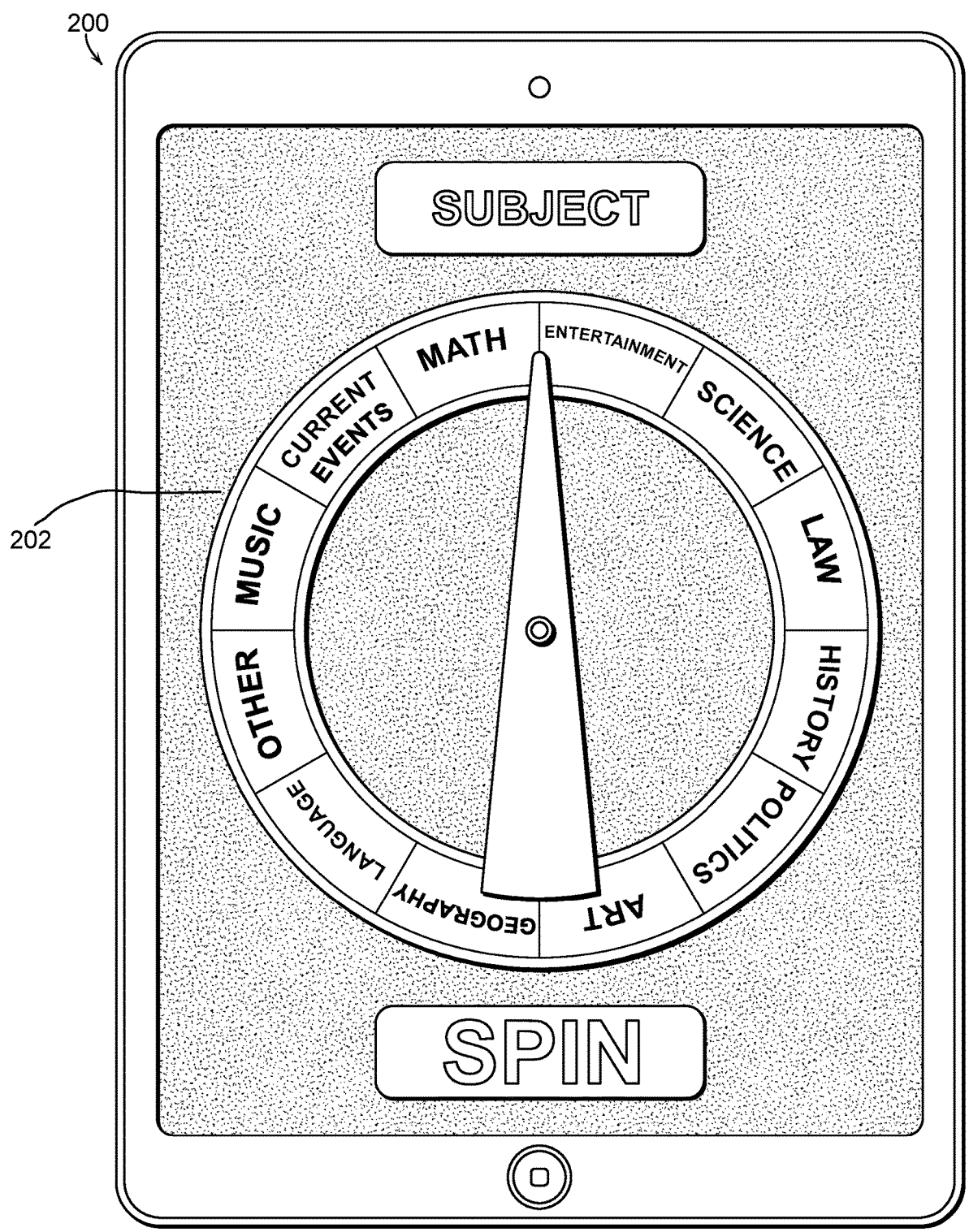
FIG. 2B shows a top view of an embodiment of the spinner 202 of the instant invention, rendered on a tablet.

In FIG. 2B a top view of an embodiment of the spinner 202 rendered on a tablet is shown. Here the prompter 200 is a tablet. However, the prompter 200 can be a smartphone, a tablet, a touchscreen laptop computer, or any other electronic device that is touch-sensitive. In one embodiment, the prompter 200 can select from the following categories: math; entertainment; science; law; history; politics; art; geography; language; music; and current events. In a preferred embodiment, there is a "wild card" option whereby a random category will be chosen. The random category can be made known to the users, or it may be kept a secret from the users. In another embodiment, users will be able to customize the categories they see fit. Preferably, these custom categories will be populated with questions generated by the users in advance of playing the game.

Figure 3A:
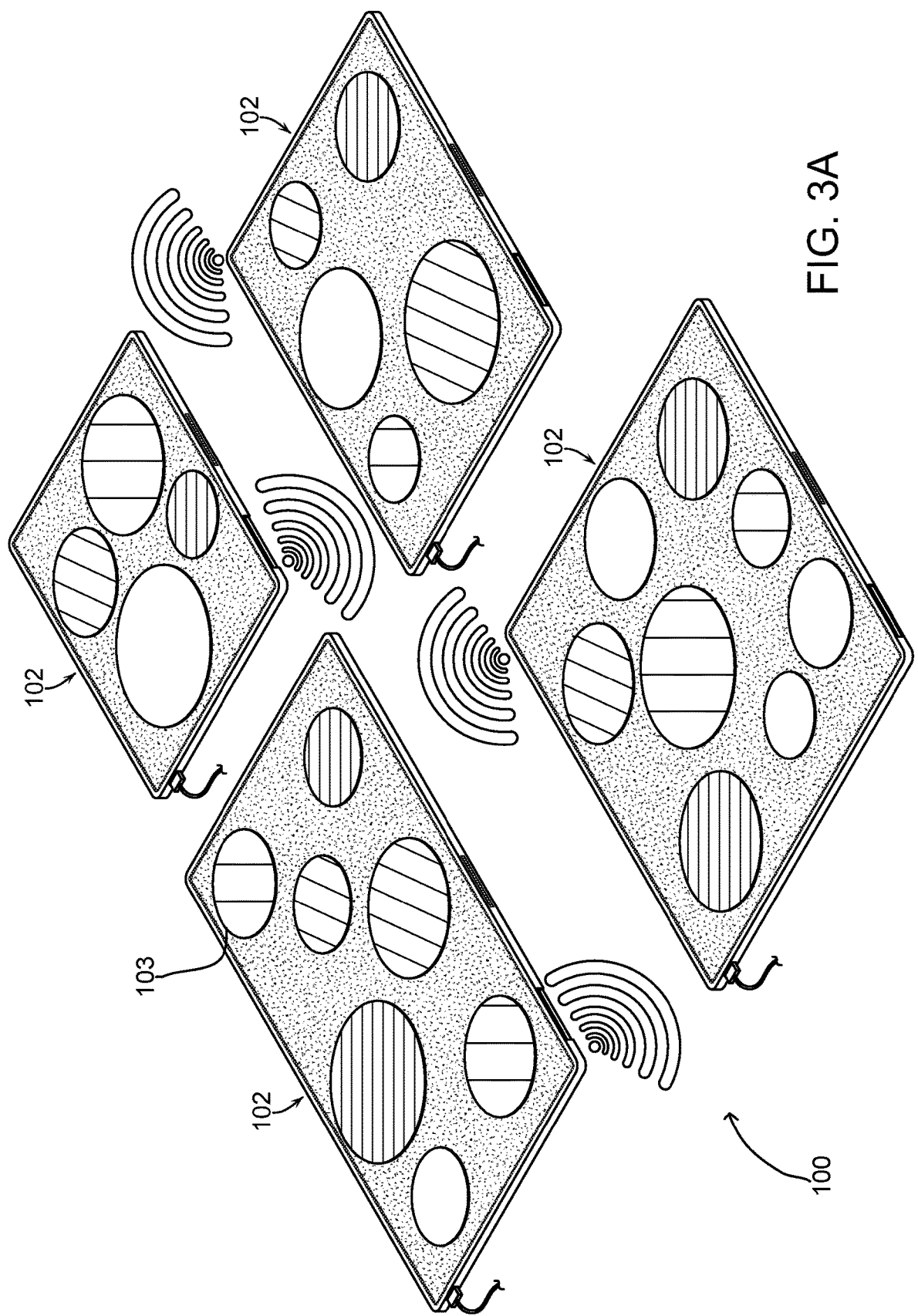
FIG. 3A shows a perspective view of an embodiment of the electronic game board of the present invention, where said game board is comprised of a plurality of touch screens.

Referring to FIG. 3A, a perspective view of an embodiment of the game board 100 of the present invention, where said game board 100 is comprised of a plurality of touch-sensitized displays 102 is shown. Here, the game board 100 is comprised of multiple touch-sensitized displays 102, in multiple housings. This embodiment has a number of benefits. When multiple users are playing, if each user has a separate touch-sensitized display 102 to interact with, the ability for them to cheat by looking at another user's selection is seriously limited. In other embodiments, users must rotate between each touch-sensitized display 102 after a predetermined amount of questions. If the touch-sensitized displays 102 are spaced far enough apart, this allows an element of exercise to be incorporated into the game. In yet another embodiment, the plurality of answer zones 103 move around the game board 100. When the game board 100 is spread across multiple touch-sensitized display 102, the answer zones 103 may migrate freely between the various boards. This is facilitated by each unit being in wireless communication with each other, as well as with the prompter shown in FIG. 3B.

Figure 3B:
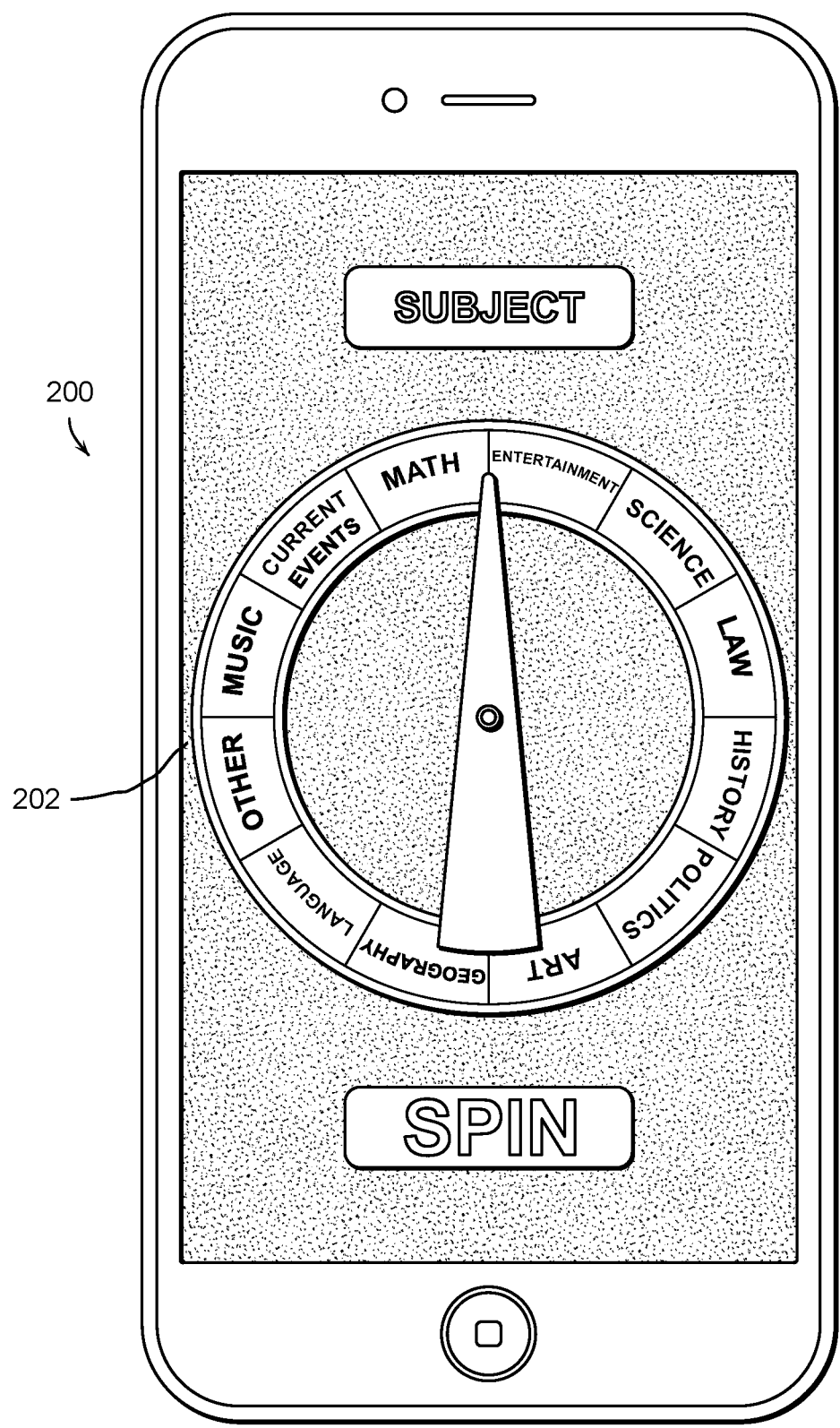
FIG. 3B shows a top view of an embodiment of the spinner 202 of the present invention, rendered on a smartphone.

FIG. 3B shows a top view of an embodiment of the spinner 202 of the present invention, rendered on a smartphone. Of note here is how prompter 200 is a smartphone, as opposed to the tablet shown in FIG. 2B.

Figure 4B:
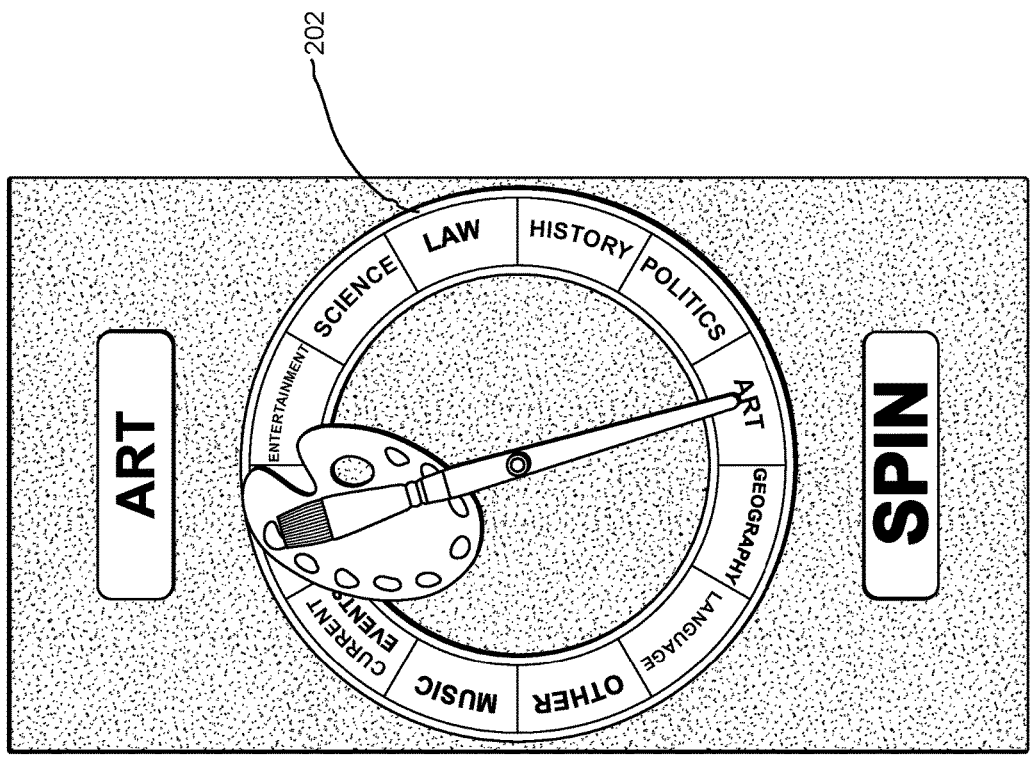
FIG. 4B shows a top view of an embodiment of a stylized spinner 202 of the present invention.
Figure 4A:
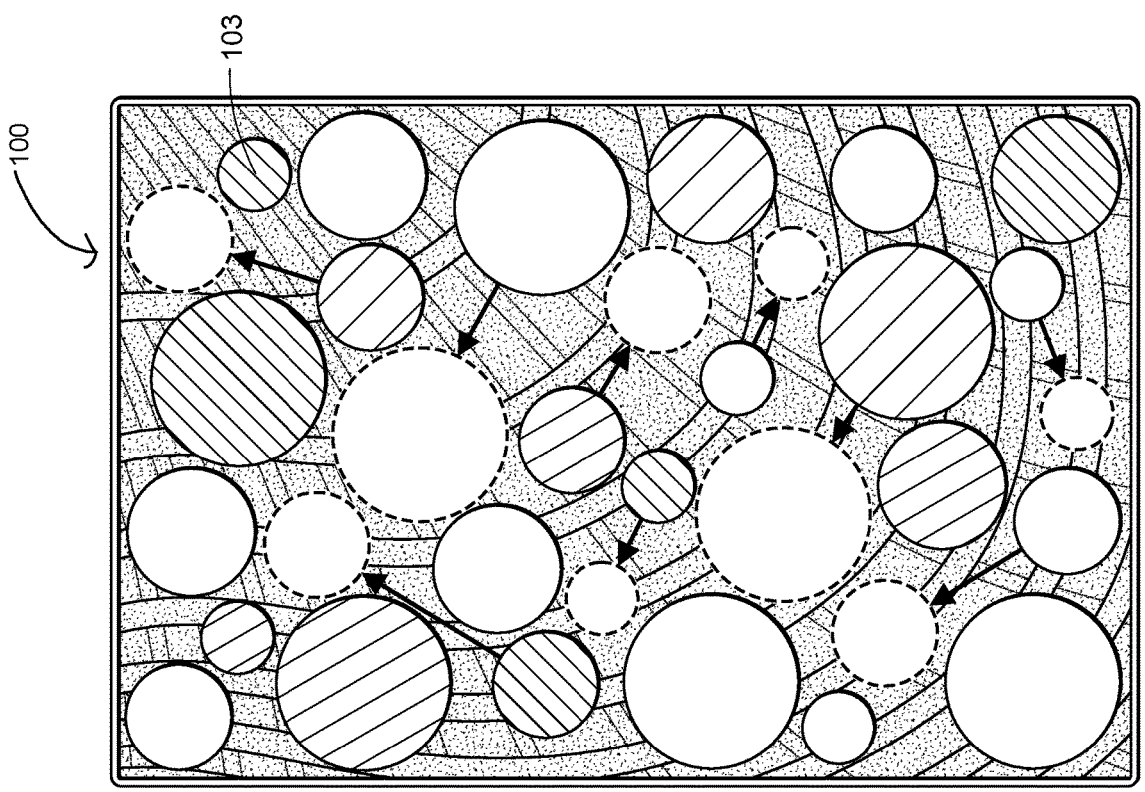
FIG. 4A shows a perspective view of an embodiment of the electronic game board of the present invention, where the answer zones that contain the answer choices are of a non-uniform size.

Referring to FIG. 4A, a perspective view of an embodiment of the game board 100 of the present invention, where the plurality of answer zones 103 that contain the answer choices are of a non-uniform size is provided. Here, plurality of answer zones 103 consists of non-uniform sized circles. While here, plurality of answer zones 103 is shown as circles, any geographic shape is suitable for use as an answer zone 103. This shape could be a pure polygon, a free-hand drawn shape, or some sort of image. In a preferred embodiment, the answer zones 103 correspond to the answer selection contained therein. For example, if the answer contained in the answer zone was the Oregon Trail, the plurality answer zones 103 may be shown as an era-appropriate wagon. In yet another embodiment, plurality of answer zones 103 will move around, adding an element of coordination to the game.

Figure 4D:
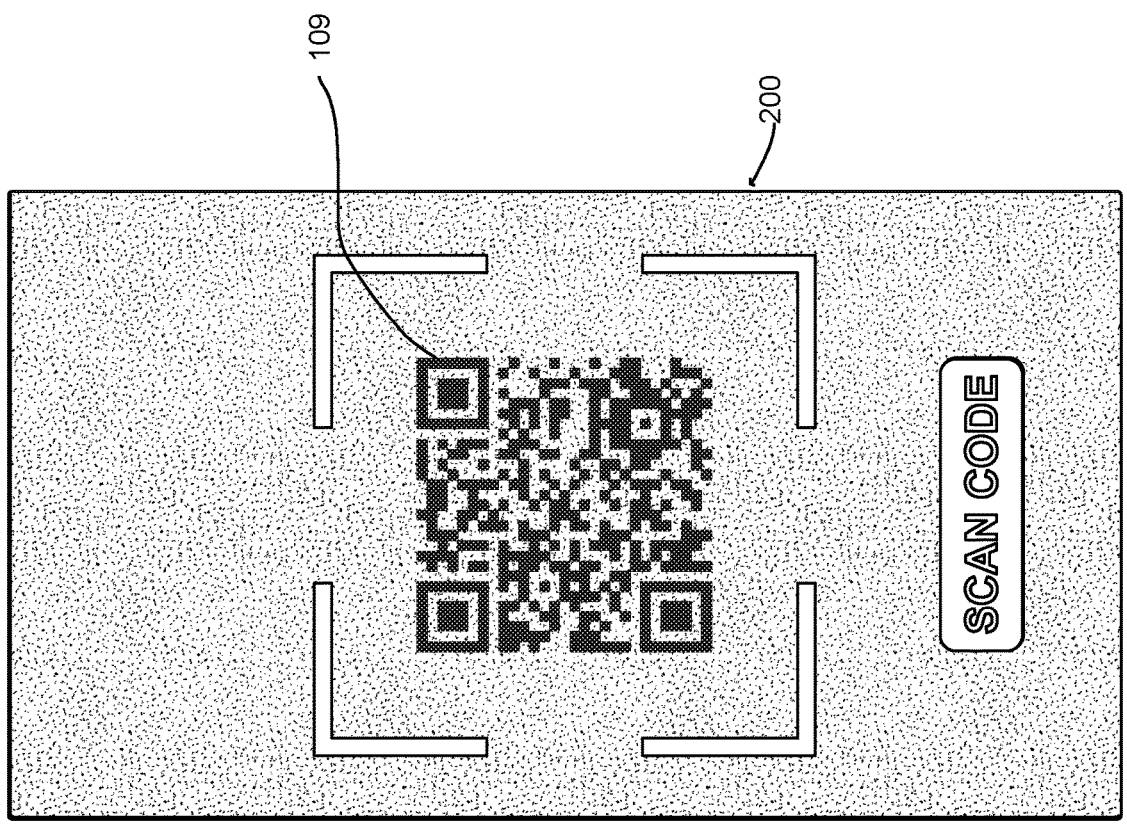
FIG. 4D shows a top view of an embodiment of the spinner 202 scanning a unique optical identifier.
Figure 4C:
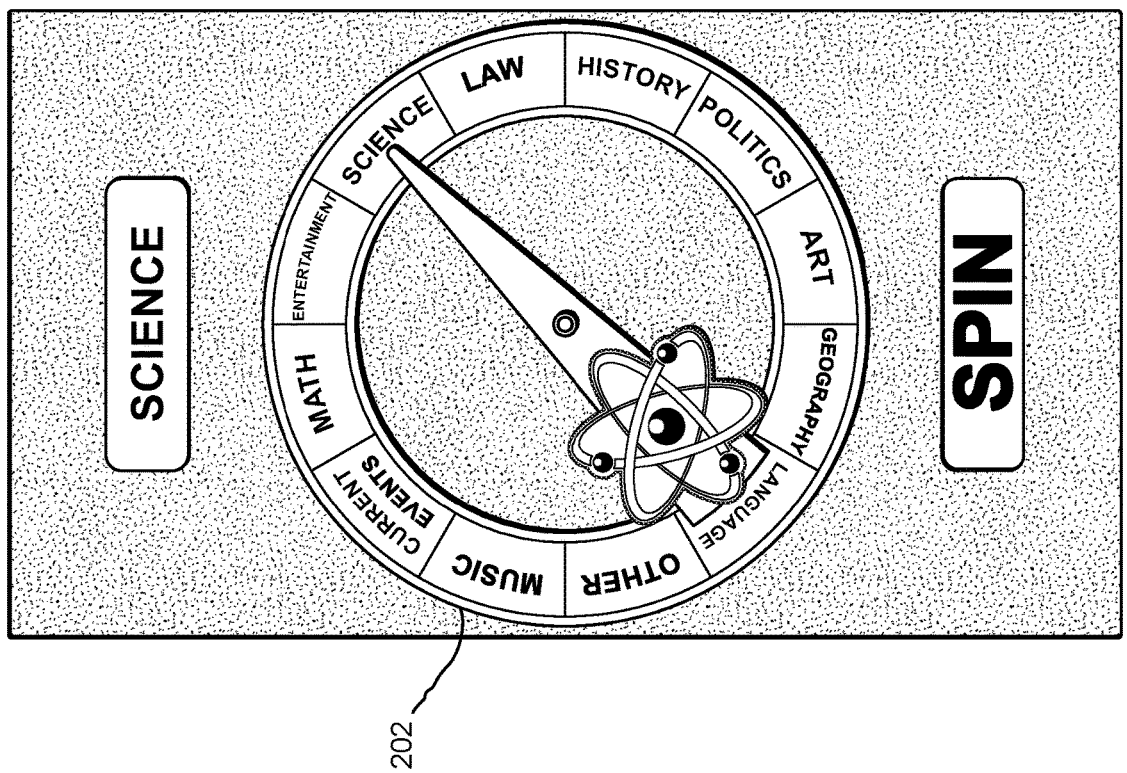
FIG. 4C shows a top view of an alternative embodiment of a stylized spinner 202 of the present invention.

Further, FIG. 4B shows the spinner 202 being stylized. That is, because the category of art was selected, the spinner now appears with an art theme. Accordingly, the game board 100 of FIG. 4A is also stylized to match the spinner. This is an optional component found in a preferred embodiment. FIG. 4C shows a stylized spinner 202 when the category is science. FIG. 4D shows the prompter 200 of the present invention scanning unique optical identifier 109.

Figure 5:
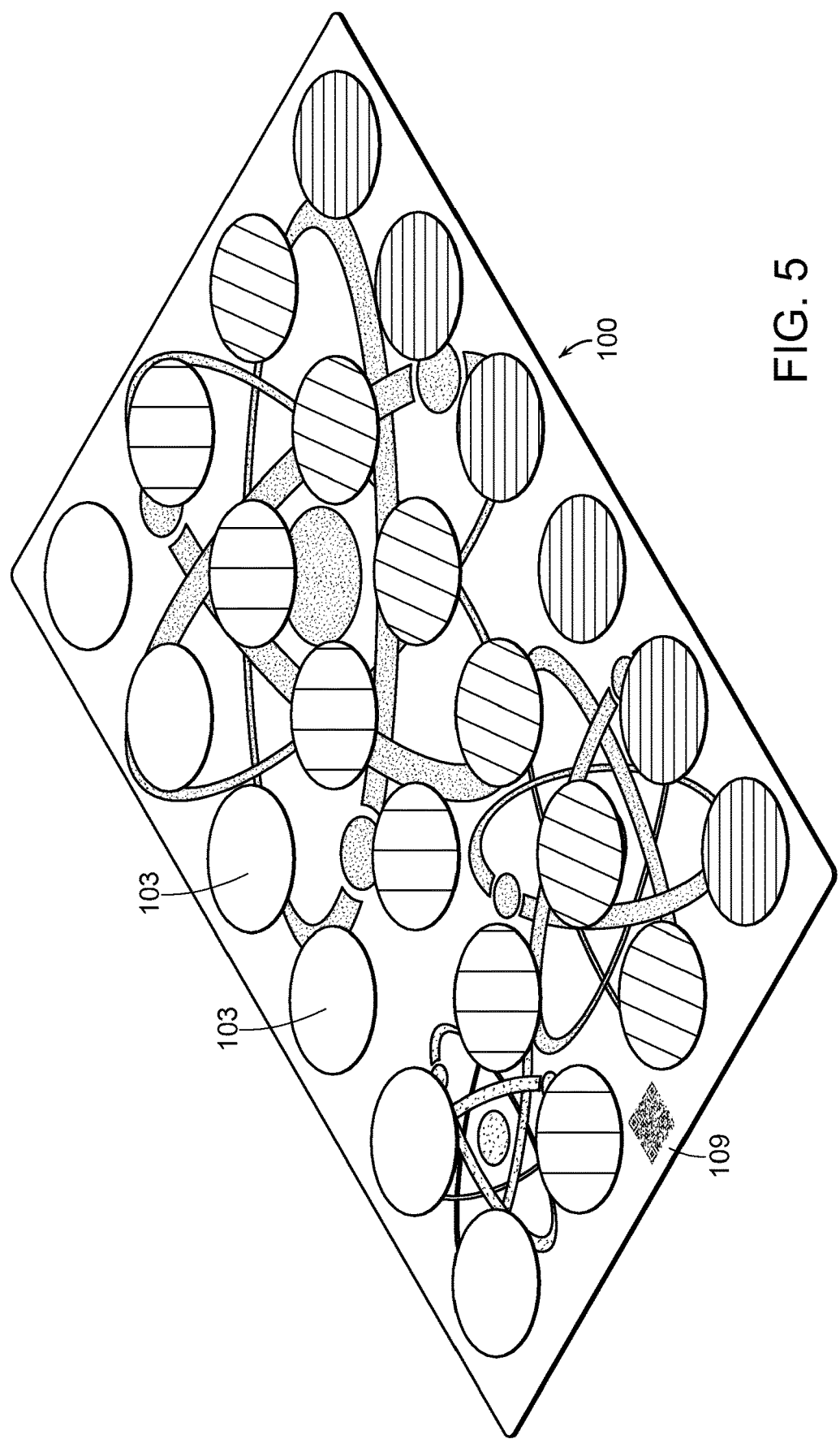
FIG. 5 shows a perspective view of an embodiment of the game board of the present invention, where the game board is a plastic mat.

FIG. 5 shows a perspective view of an embodiment of the game board 100, where the game board 100 is a plastic mat. Of note here is unique optical identifier 109. Unique optical identifier 109 is used by the prompter 200 (see FIG. 1) to learn of the answers disposed on game board 100. In this embodiment, a user may have multiple game boards 100. As a user gets tired of the first game board 100, they may use the prompter to scan the unique optical identifier 109 on the second game board 100, and the prompter 200 (see FIG. 1) will display the appropriate categories and subcategories while loading the appropriate questions. Note here how game board 100 is stylized for the science category.

Figure 6A:
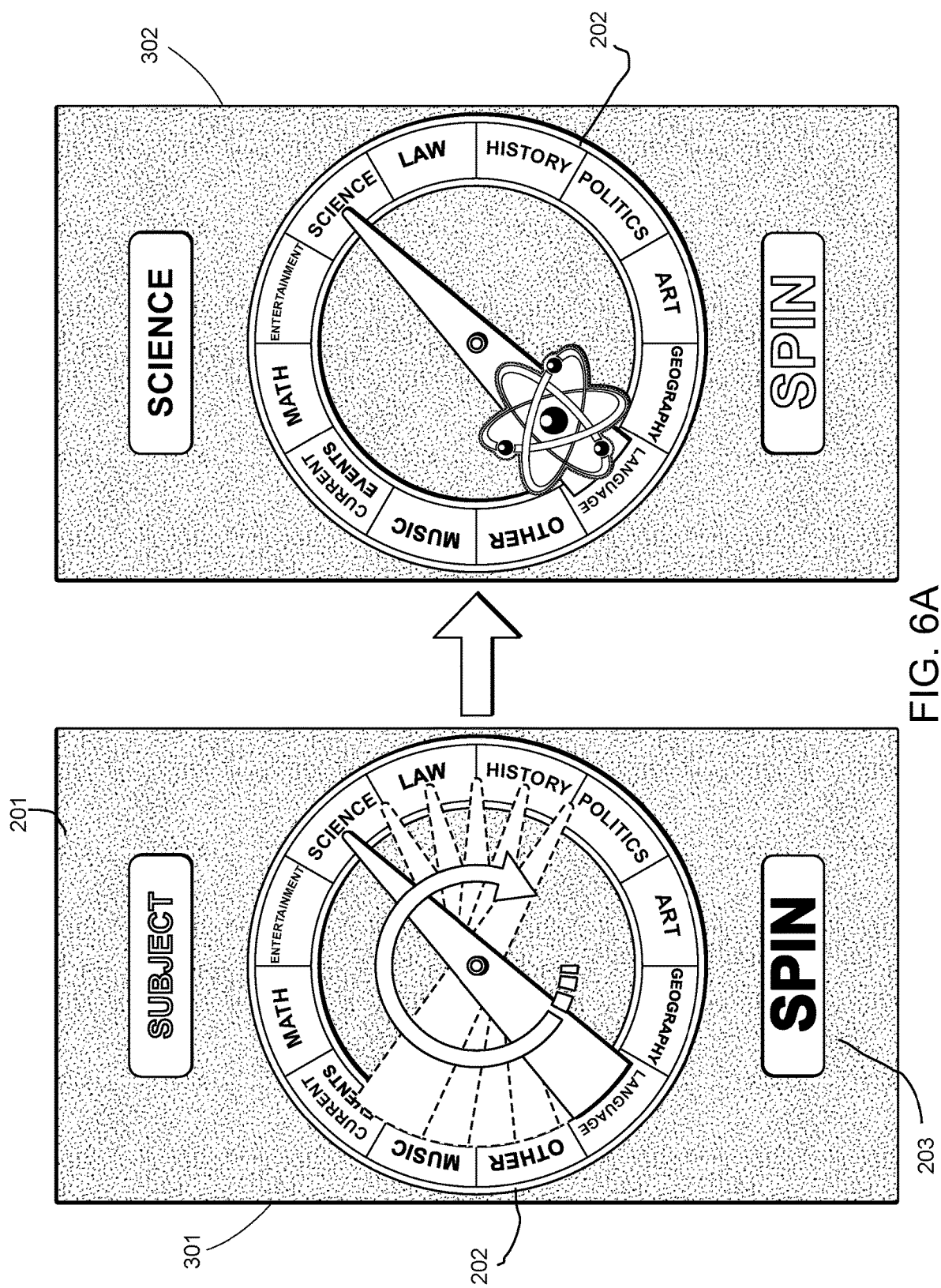
FIGS. 6A-6B show screenshots of an embodiment of the method of the present invention.
Figure 6B:
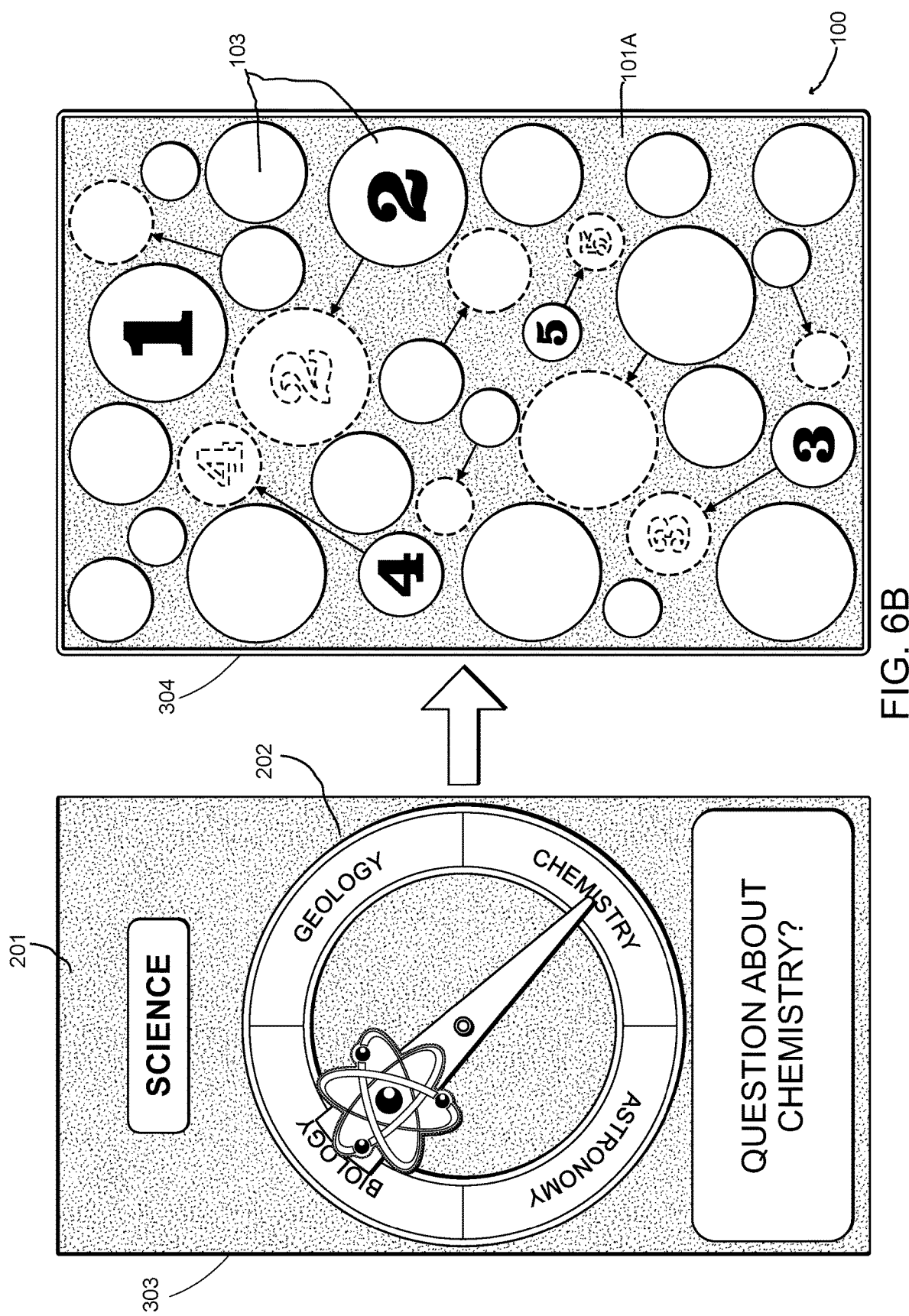

Referring the FIGS. 6A-6B, various screenshots of an embodiment of the method of the present invention being performed are shown. First, a user will touch the spin initiator 201 shown in screen 301. As shown, the spinner 202 will spin for a predetermined amount of time until it lands on a category, as shown in screen 302. In an alternative embodiment, the spinner 202 will spin indefinitely, and a user will touch the screen a second time to stop the spinner 202. In this embodiment, after landing on a category in screen 302, a spinner 202 showing subcategories is shown, as seen in screen 303. Once again the user will touch the touch-sensitized display 201 such that the spinner 202 spins, and it will arrive at one of the subcategories in the manner previously described. Once the subcategory has been selected, a question will be randomly chosen. In some embodiments, the question will merely be displayed visually, in other embodiments, the question will be read aloud. Once the question has been seen or read, a user is brought to screen 304 where they are presented with a plurality of answer zones 103. As shown here, these answers zones 103 will be of various sizes and will preferably move around the touch-sensitized display 102, shown in screen 304. In a preferred embodiment, this embodiment is performed on at least two devices independently selected from the group consisting of smartphones, tablets, touch-sensitized laptop computers, and any other internet-enabled electronic device with a touchscreen. This embodiment is particularly suitable for two users sitting next to each other on a road trip, while each user participates on their respective device. Here, the electronic game board 100 and the prompter 200 are the same device.

Figure 6C:
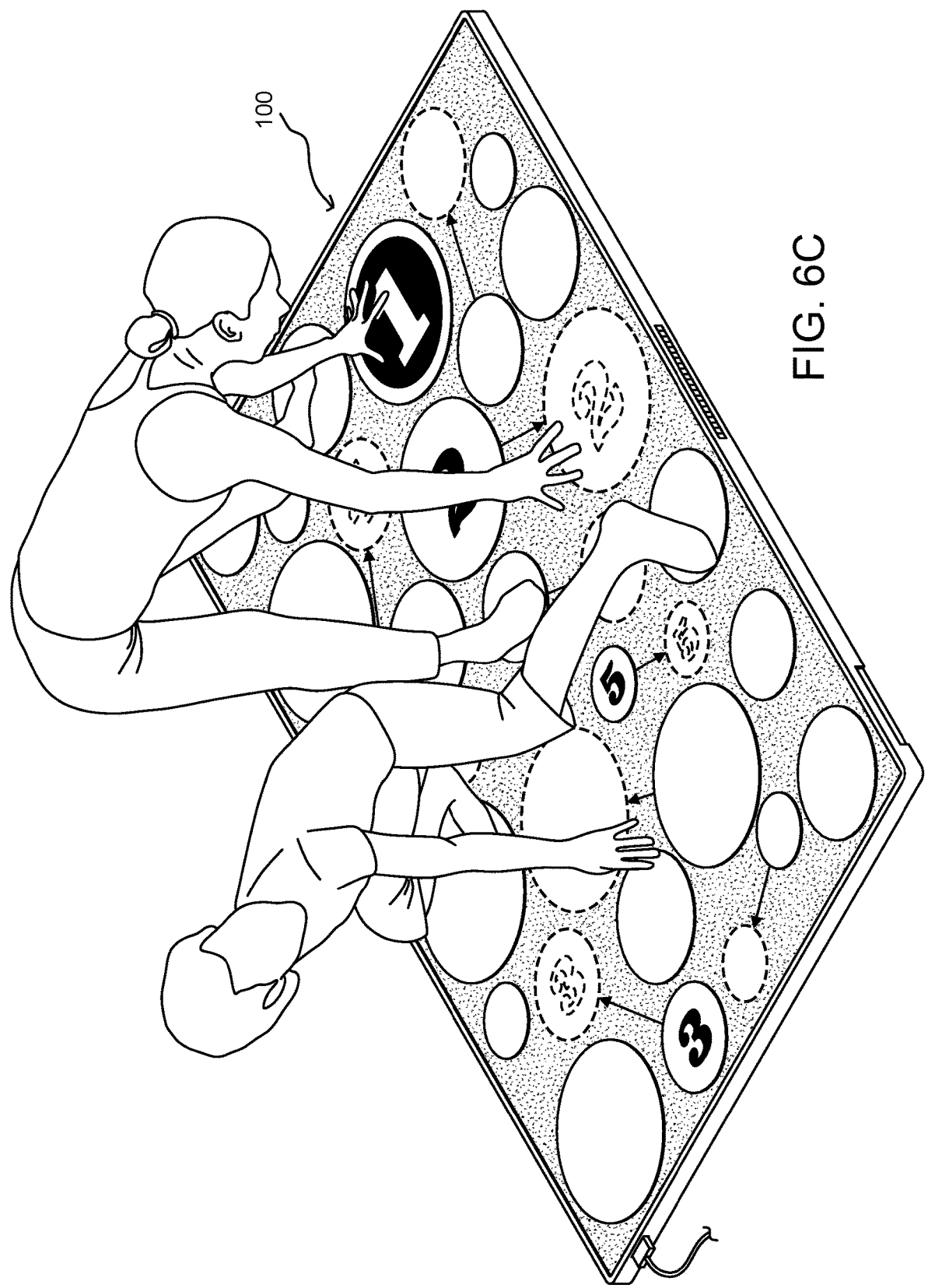
FIG. 6C shows two participants participating in an embodiment of the method of the present invention, on an electronic game board of the present invention.

FIG. 6C shows two participants participating in an embodiment of the method of the present invention, on a game board 100 of the present invention.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented an educational balancing game. The disclosure is illustrated by example in the drawing figures, and throughout the written description. It should be understood that numerous variations are possible while adhering to the inventive concept. Such variations are contemplated as being a part of the present disclosure.

What is claimed is:

1. An educational balancing game, for helping one human user educate themselves while developing motor skills by standing on and interacting with an electronic game board and a prompter,
   the electronic game board having:
      a top surface, having a first touch-sensitized display disposed thereon;
      a bottom surface, located below the top surface; and
      a plurality of walls extending between the top surface and the bottom surface, the plurality of walls having a recess, a power port, and a chamber defined by the top surface, the bottom surface, and the plurality of walls,
         wherein the chamber holds a first processor, a first memory, and a first wireless transceiver,
         wherein the first processor, the first memory, the first wireless transceiver, and the first touch-sensitized display are in electronic communication,
         wherein the first memory is equipped with a first series of commands in a computer-readable form,
         wherein the first processor is configured to perform the first series of commands in computer-readable form,
         wherein the electronic game board is configured to show a plurality of answer zones on the first touch-sensitized display and to support the weight of one human user standing thereon;
   the prompter having:
      a second touch-sensitized display;
      a second processor;
      a second memory; and
      a second wireless transceiver, for providing wireless electronic communication with the electronic game board,
         wherein the second touch-sensitized display, the second processor, the second memory, and the second wireless transceiver are in electronic communication, wherein the second memory is equipped with a second series of commands in computer-readable form,
         wherein the second processor is configured to perform the second series of commands in computer-readable form,
         wherein the first series of commands and the second series of commands are executed to perform:
            a) receiving by the second processor, a final score input from the human user, causing the second processor to store the final score on the second memory;
            b) receiving by the second processor from the second memory a plurality of categories;
            c) displaying the plurality of categories by the second processor on the second touch-sensitized display;

d) initializing by the second processor, a spinner and spin initiator displayed on the second touch-sensitized display;
e) receiving an input from the user on the second touch-sensitized display to initiate the spinner used to select one of the plurality of categories, the selected category stored in the second memory;
f) displaying on the second touch-sensitized display by the second processor receiving instructions from the second memory, a question corresponding to the selected category stored on the second memory;
g) transmitting to the electronic game board via the second wireless transceiver, a correct answer to be stored on the first memory and processed by the first processor;
h) displaying by the first processor on the first touch-sensitized display, a plurality of answer zones, a portion of the plurality of answers zones containing a correct answer, the remainder of the plurality of answer zones containing incorrect answers, wherein each answer zone contains one answer, each answer zone having a size and a position, where the size is dynamic and the position is dynamic;
i) receiving by the first processor, a selection of the human user, each selection being of one of the plurality of answer zones, wherein the size and the position of the selected answer zone becomes static upon selection;
j) transmitting from the first wireless transceiver to the second processor via the second wireless transceiver, whether an answer zone selected by the human user contains the correct answer;
k) adding by the second processor, a point for each selection of one of the plurality of answer zones containing the correct answer; and
l) repeating steps d-k until the points earned by the human user is equal to the final score.

* * * * *